F. M. GODDARD.
ARMORED MOTOR CYCLE.
APPLICATION FILED JUNE 1, 1917.

1,239,476.

Patented Sept. 11, 1917.
2 SHEETS—SHEET 1.

INVENTOR
Frederick M. Goddard,
BY
James F. Duhamel,
ATTORNEY

F. M. GODDARD.
ARMORED MOTOR CYCLE.
APPLICATION FILED JUNE 1, 1917.
1,239,476.
Patented Sept. 11, 1917.
2 SHEETS—SHEET 2.
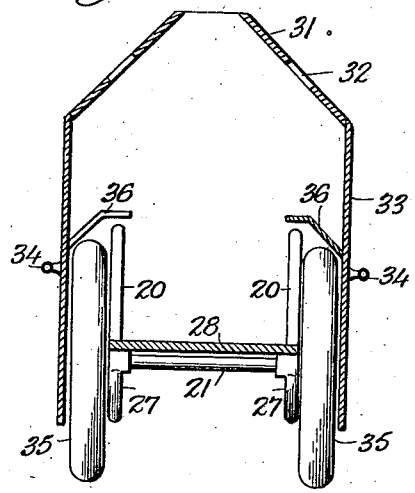
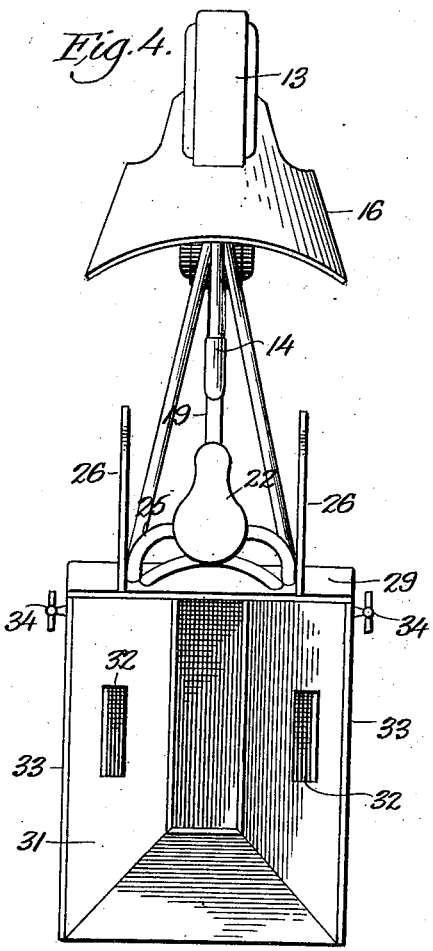
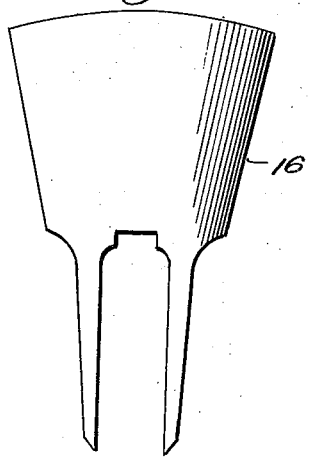
INVENTOR
Frederick M. Goddard.
BY
James F. Duhamel,
ATTORNEY

UNITED STATES PATENT OFFICE.

FREDERICK M. GODDARD, OF BROOKLYN, NEW YORK.

ARMORED MOTOR-CYCLE.

1,239,476.  Specification of Letters Patent.  Patented Sept. 11, 1917.

Application filed June 1, 1917. Serial No. 172,138.

*To all whom it may concern:*

Be it known that I, FREDERICK M. GODDARD, a citizen of the United States, and resident of Brooklyn, in the county of Kings and State of New York, have invented certain new and useful Improvements in Armored Motor-Cycles, of which the following is a specification.

This invention relates to motor vehicles and especially to that class known as motor cycles and adapted to be provided with armor plate protection about its vulnerable parts and forming a cab to protect passengers which it is carrying from rifle or gun fire and having port holes and doors and open at the top, the object of the invention being to form a small portable fighting machine to carry several soldiers for offensive operations, as will be more fully described in the following specification, set forth in the claims and illustrated in the accompanying drawings, wherein:

Fig. 3 is a sectional view on line 3—3 of Fig. 1.

Fig. 4 is a plan view.

Fig. 5 is a front view of the shield.

Figure 1:
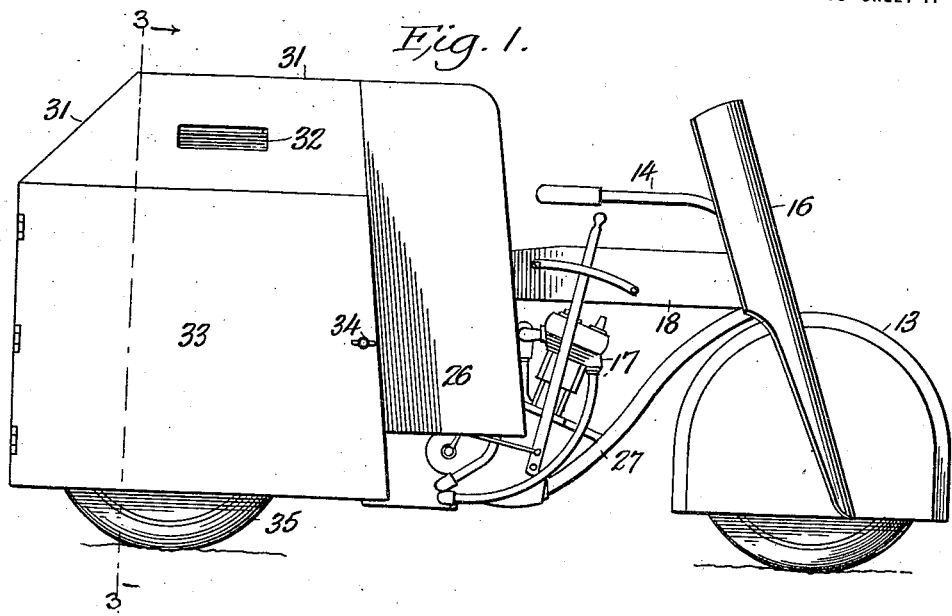
Figure 1 is a side elevation of the improved motor cycle.
Figure 2:
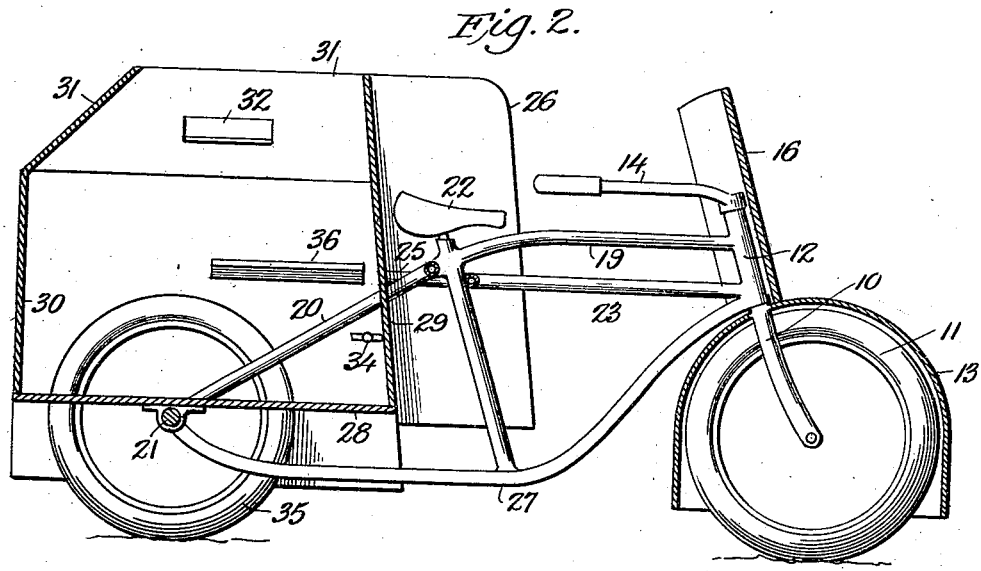
Fig. 2 is a similar view with the cab in section and the engine removed.

The motor cycle frame may be of the ordinary type and have the fork 10 for the front wheel 11 mounted in the sleeve 12 at the front of the frame and carrying the shield 13 which almost completely envelops the wheel 11 and turns with it when the course of the vehicle is changed by means of the handle bar 14.

The wheel shield 13 carries an upright shield 16 which protects the driver from the front and likewise the engine 17, fuel tank 18 and handle bar 14.

The frame of the device comprises a bar 19 terminating at the rear as a fork 20 whose ends are connected with the axle 21 and this bar carries the driver's seat 22. A second horizontal bar 23 is forked at 24 and the two side arms 25 extend rearward and sideward to be connected with side shields 26 which protect the driver.

A third bracing means for the frame is the bars 27 which are spread to each side of the axle 21 and attached thereto. These and the other bars being of metal tubing of suitable strength to carry the weight imposed upon them.

The cab of the device comprises a flooring 28 supported on the axle 21 and carrying the front wall 29 and the rear wall 30 which in turn support the inclined roofing 31 for three sides and having openings or port holes 32 at the sides. This structure has at each side the doors 33 hinged at the rear edge and having knobs 34 for a latch on the inside and outside, the said doors depending below the floor 28 so as to protect the rear wheels 35 at the ends of the axle 31.

The shields and the walls and the roofing are preferably of armor plate of any desired thickness to afford rapid movement of the vehicle and protect the occupants and any delicate parts from the fire of small arms, or the sides of the cab may be made up of layers of bullet proof material whose weight would not impede the movements of the machine.

The ends of the fork 20 within the cab act as fenders to protect the occupants from the wheels 35 and it may be found convenient to provide the doors 33 with shelves or pockets 36 to contain ammunition and upon which the occupants may sit while firing through the openings 32, the said shelves being at different ends of the doors to provide ease of operation for the right arm of each of two occupants while firing through the openings 32.

The engine and fuel tank may be of any desired type and located at any convenient part of the frame, or the latter may be so altered as to provide for some different type of engine but capable of supporting the cab as above described.

The device as above described is capable of accommodating three occupants but it is obvious that provisions may be made for more or less as the occasion may demand. It is obvious therefore, that the vehicle may be otherwise arranged or modified without departing from the essential features above described or from the scope of the appended claims.

What I claim as new is:

1. In a motor cycle, the combination with the front fork of the same, of a front wheel, a shield enveloping the front wheel, an upright shield at the front of the fork, rear extensions to the frame of the motor cycle, a rear axle carrying wheels, a cab comprising front and rear armor plate walls and a roof of the same material, and doors for the cab.

2. In a motor cycle, the combination with the frame of the same, of a front wheel, a shield substantially enveloping the wheel, an upright shield carried by the enveloping shield, a cab carried by the rear of the frame and comprising a front and rear wall, sloping roof sections, extension shields from the front wall, and doors for the cab.

3. In a motor cycle, the combination with the frame thereof, of a front wheel and fork, a shield substantially enveloping the wheel, an upright shield carried by the enveloping shield and the fork, a rear axle and wheels, a floor above the axle, a front and rear armored wall carried by the floor, sloping roof section, extension shields on the front wall, and depending doors between the front and rear walls.

4. In a motor cycle, the combination with the frame of the same, of a front fork and wheel, a shield about the wheel and carried by the fork, an axle with rear wheels, extensions to the frame, an armored cab supported by the axle and extensions, shields at the front of the cab, a sloping roof for the cab and having port holes, and doors for the cab with pockets and depending below the said cab so as to protect the rear wheels.

5. In a motor cycle, the combination with the same, of a cab carried at the rear of the vehicle and protecting the rear wheels, means connected with the cab for protecting the driver, and protecting means on the front wheel.

6. In a motor cycle, the combination with the same, of a cab at the rear of the motor cycle and protecting the rear wheels and the driver, means for protecting the front wheel, and a shield for the driver on the said front wheel.

7. In a motor cycle, the combination with the same, of armored means protecting the rear wheels of the motor cycle and adapted to contain passengers, protecting means for the driver, and shields on the front wheel.

Signed at New York, in the county of New York and State of New York, this 21 day of May, A. D. 1917.

FREDERICK M. GODDARD.

Copies of this patent may be obtained for five cents each, by addressing the "Commissioner of Patents, Washington, D. C."